US008503654B1

(12) United States Patent
Ludwig (10) Patent No.: US 8,503,654 B1
(45) Date of Patent: Aug. 6, 2013

(54) SYSTEMS AND METHODS FOR AUTOMATED CONFERENCE CALL INITIATION

(75) Inventor: Scott Ludwig, Kirkland, WA (US)

(73) Assignee: Google, Inc., Mountain View, CA (US)

( * ) Notice: Subject to any disclaimer, the term of this patent is extended or adjusted under 35 U.S.C. 154(b) by 552 days.

(21) Appl. No.: 12/489,934

(22) Filed: Jun. 23, 2009

Related U.S. Application Data

(60) Provisional application No. 61/074,959, filed on Jun. 23, 2008.

(51) Int. Cl.
*H04M 3/42* (2006.01)
*G06F 15/16* (2006.01)

(52) U.S. Cl.
USPC ............ 379/202.01; 379/203.01; 379/205.01; 379/207.13; 455/416; 709/204

(58) Field of Classification Search
USPC ............... 379/202.01, 142.17, 88.16, 211.02, 379/203.01, 204.01, 205.01, 201.01, 207.13, 379/207.15; 345/751; 455/416; 709/204
See application file for complete search history.

(56) References Cited

U.S. PATENT DOCUMENTS

| 6,275,575 | B1* | 8/2001 | Wu | 379/202.01 |
|---|---|---|---|---|
| 7,542,756 | B2* | 6/2009 | Mason et al. | 455/416 |
| 2004/0141005 | A1* | 7/2004 | Banatwala et al. | 345/751 |
| 2006/0177034 | A1* | 8/2006 | Reding et al. | 379/211.02 |
| 2007/0033251 | A1* | 2/2007 | Mandalia et al. | 709/204 |
| 2008/0159490 | A1* | 7/2008 | Gaudin et al. | 379/88.16 |
| 2008/0159503 | A1* | 7/2008 | Helbling et al. | 379/142.17 |
| 2008/0219426 | A1* | 9/2008 | Lai | 379/202.01 |

OTHER PUBLICATIONS

James D. Herbsleb, et al., "Introducing Instant Messaging and Chat In The Workplace", ACM CHI 2002, Apr. 2002, pp. 1-8, Minneapolis, Minnesota.

* cited by examiner

*Primary Examiner* — Thjuan K Addy
(74) *Attorney, Agent, or Firm* — Leydig, Voit & Mayer, Ltd.

(57) ABSTRACT

Systems and methods for automated conference call initiation are provided. In an embodiment, a system for providing automated conference call initiation includes at least one meeting server, at least one calendar server and at least one profile server. A conference call initiator then uses data on the calendar server, the profile server and the meeting server to automatically initiate a conference call. In another embodiment, a method for providing automated conference call initiation involves analyzing the data on a meeting server to determine meeting conditions of two or more users, and initiating a conference call between two or more users based on the meeting conditions.

17 Claims, 8 Drawing Sheets

SYSTEMS AND METHODS FOR AUTOMATED CONFERENCE CALL INITIATION

BACKGROUND

1. Field of the Invention

Embodiments of the present invention relate to conference call technology.

2. Related Art

Present day telephone and communication systems allow a user or a group of users to communicate over various types of networks. Networks can carry voice or data between users. Users speak to each other using communication devices such as telephones. Telephones and other communication devices allow two or more users to communicate simultaneously. In cases where more than two users wish to communicate with one another, a conference call may need to be initiated.

Conference calls may allow two or more users to communicate with each other simultaneously. In certain cases, a conference call may be a service feature on a communication device such as a telephone. An example of a conference may involve a called party and a calling party. A calling party may initiate the conference call. Once a conference call has been initiated, a calling party may invite a called party to join the conference call.

Conference calls may allow different levels of participation. As an example of this, a called party may be able to only listen in on an audio portion of the conference call. If additional participation is needed, the called party may be able to speak in addition to listening to the audio portion of a conference call. Such levels of participation may depend on the calling party who may be the initiator of the conference call.

A conference call may allow several users to collaborate. In most cases, users may schedule a conference call at a time that may be mutually convenient to both the initiator or calling party and called parties. At the time when the conference call is to take place, the calling party or the initiator, calls the called parties and adds them to the conference call. In another example, all parties involved in the conference call, may be able to join the conference call themselves by dialing a number and connecting to a device such as a conference bridge. A conference bridge may be communication equipment designed to link communication channels so as to allow for a conference call to be initiated.

Regardless of the various methods used to initiate a conference call, all the parties involved in the conference call may need to remember the time of the conference call. At the time when the call is to take place, they will have to either wait to be invited into a conference call or dial a specific number in order to connect to the conference call. Furthermore, a conference call may have an agenda. This agenda may indicate which users may be needed for certain portions of the call. It may be necessary for all the parties involved in the conference call to remember the time of the conference call and the agenda of the conference call.

Overheads involved in scheduling and agenda management of a conference call may detract users from a topic that may need to be discussed during the conference call and may result in a loss of valuable time. Improved conference calling methods and systems are needed that save user time and enhance user experience.

BRIEF SUMMARY

Embodiments of the present invention relate to systems and methods for automated conference call initiation. In an embodiment, a system for providing automated conference call initiation includes at least one meeting server, at least one calendar server and at least one profile server. A conference call initiator then uses data on the calendar server, the profile server and the meeting server to automatically initiate a conference call.

In another embodiment, a method for providing automated conference call initiation involves analyzing the data on a calendar server, meeting server or profile server to determine meeting conditions of two or more users, and initiating a conference call between two or more users based on the meeting conditions.

In this way, conference calls may be automatically initiated based on meeting conditions. Meeting conditions may be determined from data present in the meeting server, the profile server and the calendar server. In this way, automated initiation of conference calls may save user time and enhance user experience.

Further embodiments, features, and advantages of the invention, as well as the structure and operation of the various embodiments of the invention are described in detail below with reference to accompanying drawings.

BRIEF DESCRIPTION OF THE FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

Embodiments of the present invention relate to systems and methods for automated conference call initiation. In embodiments of this invention, conference calls are initiated in a manner as to save user time and enhance user experience.

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

This detailed description of embodiments of the present invention is divided into several sections. The first section describes an automated conference call initiation system according to an embodiment of this invention with respect to FIGS. 1-2. The second section describes various methods according to embodiments of this invention, which may be used in operation of the automated call initiation system with respect to FIGS. 3-6. The third section describes an example operation of an automated conference call initiation system with respect to FIG. 7.

System

Figure 1:
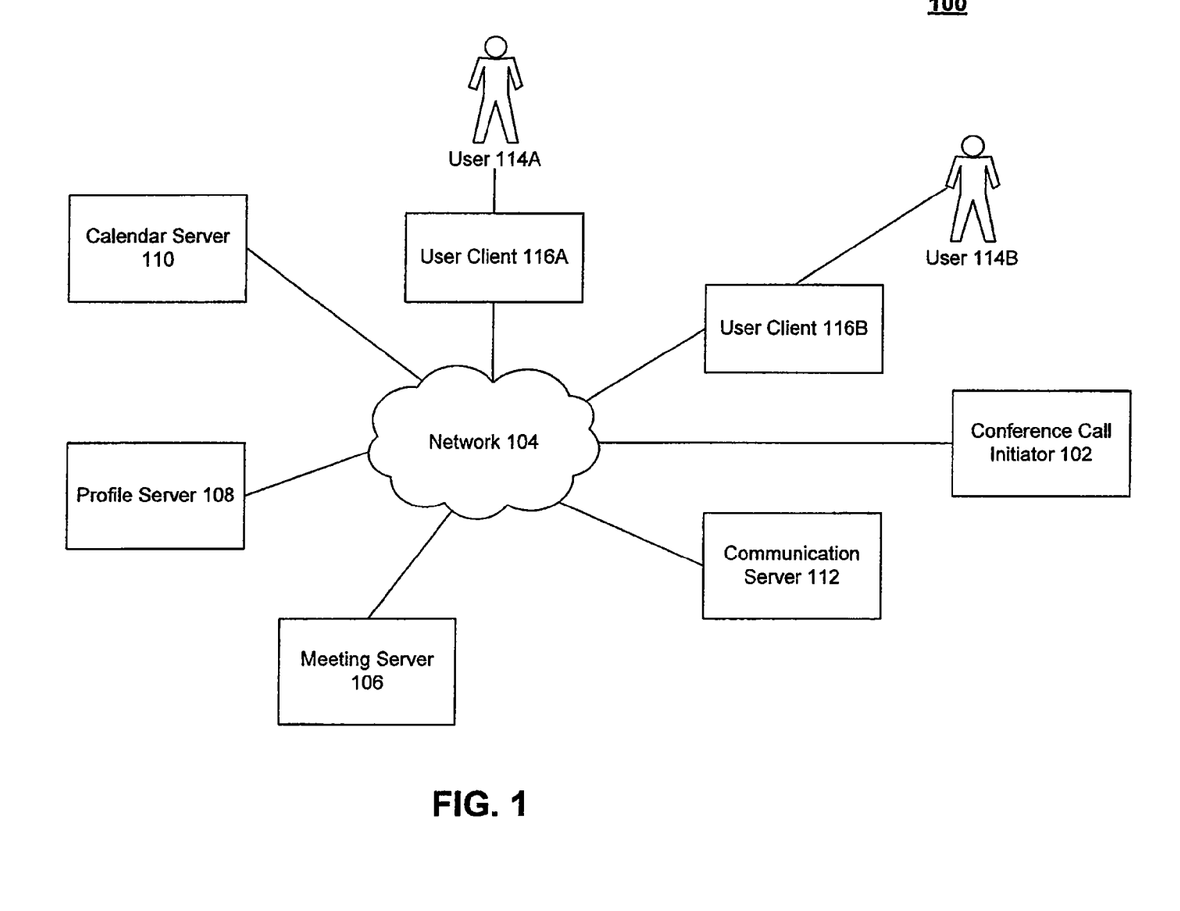
FIG. 1 is an architecture diagram of a conference call system according to an embodiment.
Figure 2A:
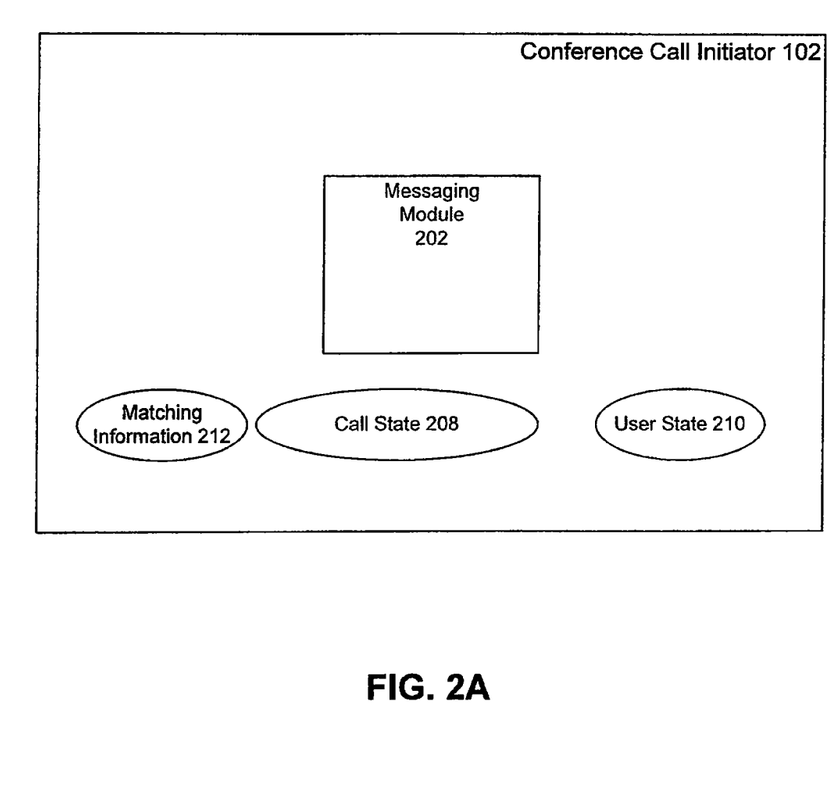
FIG. 2A illustrates an embodiment of a conference call initiator according to an embodiment.
Figure 2B:
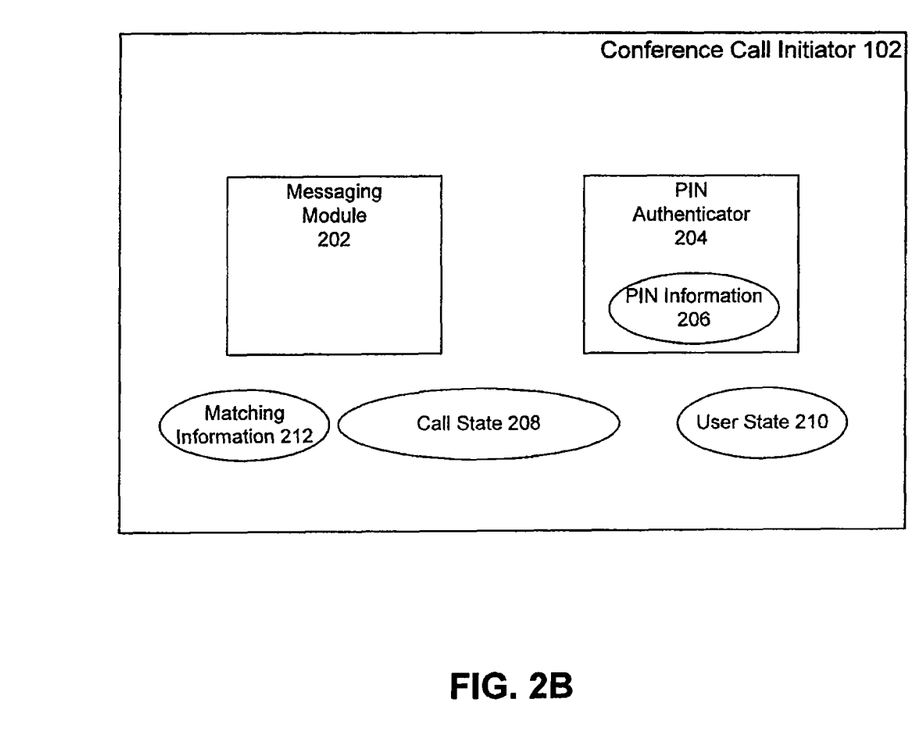
FIG. 2B illustrates another embodiment of a conference call initiator according to an embodiment.

This section describes an automated conference call initiation system according an embodiment of this invention with respect to FIG. 1, FIG. 2A and FIG. 2B.

FIG. 1 is an architecture diagram of an automated conference call initiation system according to an embodiment of this invention. FIG. 1 contains automated conference call initiation system 100.

Automated conference call initiation system 100 includes a calendar server 110, profile server 108, meeting server 106, communication server 112 and a conference call initiator 102 connected to network 104. System 100 further includes users 114A and 114B interacting with network 104 using user clients 116A and 116B respectively. For clarity, the specification may describe operation of automated call initiation system 100 with respect to users 114A and 114B and corresponding user clients 116A and 116B. However, system 100 may allow several users and a plurality of clients to connect to network 104. Therefore, it should be understood that any description of automated conference call initiation system 100 may apply to a plurality or users and a plurality of user clients. Network 104 may include one or more networks that can carry voice or data, including but not limited to, a public switched telephone network, local area network, medium-area network, and/or wide-area network, such as, the Internet.

Each of the components of automated conference call initiation system 100, calendar server 110, profile server 108, meeting server 106, communication server 112, conference call initiator 102 and user clients 116A-B may be implemented as software, hardware, firmware, or any combination thereof.

Calendar server 110 may include data related to a user's calendar or a schedule of tasks. As an example, calendar server 110 may include calendar information of user 114 or a plurality of users. Calendar information may include information on dates and times during any particular time frame when users are available for meetings or busy in other tasks. As an example, calendar information may be stored as a data structure with every user having a unique record in the data structure that stores the user's calendar or a schedule of tasks for any particular time frame.

Calendar server 110 may be able to communicate with user clients 116A-B through network 104. User clients 116A and 116B may communicate calendar information provided by users 114A and 114B respectively to the calendar server 110. In this way updates to calendar information may be provided to calendar server 110. Calendar server 110 is able to communicate with profile server 108, meeting server 106, communication server 112, conference call initiator 102 and user clients 116A-B through network 104. As an example, not intended to limit the invention, information obtained from the meeting server 106 may be used to update the calendar information in calendar server 110. In another embodiment, not intended to limit the invention, calendar information in calendar server 110 may be used to schedule a meeting for two or more users.

Profile server 108 may include data related to a user's profile. As an example, profile server 108 may include profile information of user 114 or a plurality of users. Profile information may include information on a user's name, a user's designation or a job title within an organization, and other user preferences such as reminders before scheduled conference calls and the duration of such reminders. As an example, profile information may be stored as a data structure with every user having a unique record in the data structure that stores the user's profile for any particular time frame. Profile server 108 may be able to communicate with user clients 116A-B through network 104. User clients 116A-B may communicate profile information provided by users 114A-B to the profile server 108. In this way updates to profile information may be provided to profile server 108.

In an embodiment, profile server 108 may determine and track a user's cell phone location, a user's workstation location or both cell phone and workstation locations. For example, profile server 108 may receive location information from a cell phone (or any other mobile device) that can be used to track the cell phone. Also, for example, when a user is at a different location from a meeting workstation, profile server 108 may route meeting information and communication to the user's cell phone instead of (or in addition to) the user's workstation.

Profile server 108 may also be able to communicate with calendar server 110, meeting server 106, communication server 112, conference call initiator 102 through network 104.

Meeting server 106 may comprise information related to a user's meetings. As an example, meeting server 106 may have the meeting information of users 114A-B or a plurality of users. Meeting information may include information on meetings such as their current status. For example, current status may include information such as the name of a user who scheduled a meeting, names of users who are required to be in that meeting and if those users have accepted or declined to be in that meeting. Meeting information may also comprise agenda information of a meeting. Agenda information may include the names of the users to participate for a certain time period in a conference call. As an example, meeting information may be stored as a data structure with every user having a unique record in the data structure that stores the user's scheduled meetings for any particular time frame.

Meeting server 106 may be able to communicate with user clients 116A-B through network 104. User clients 116A-B may communicate meeting information provided by users 114A-B to the meeting server 106. In this way updates to meeting information may be provided to meeting server 106. Furthermore, meeting server 106 may communicate with calendar server 110 through network 104. As an example, not intended to limit the invention, information obtained from calendar server 110 may be used to update the meeting information in meeting server 106. Updates to meeting information and agenda information in meeting server 106 may be communicated to conference call initiator 102 through network 104. In this way, meeting server 106 may manage meeting information.

Communication server 112 may store connection information needed for connection to a communication network, such as a telephone network. As an example not intended to limit the invention, communication server 112 may be a PSTN (Public Switched Telephone Network) server. Communication server 112 may contain connection information needed to establish a connection to a public switched telephone network. A public switched telephone network may be used to initiate a conference call between several users. Connection information may include information on a user's name, user's telephone number and IP (internet protocol) addresses, if required, to create a connection. As an example, connection information may be stored as a data structure with every user having a unique record in the data structure that stores the user's connection information for any particular time frame.

Communication server 112 may be able to communicate with user clients 116A-B through network 104. User clients 116A and 116B may communicate connection information provided by users 114A and B respectively to the communication server 112. In this way updates to connection information may be provided to communication server 112. Communication server 112 may also be able to communicate with conference call initiator 102 through network 104. As an example, not intended to limit the invention, information obtained from conference call initiator 102 may be used to update connection information in communication server 112.

User clients 116A-B may allow users 114A-B or a plurality of users to connect to network 104. As an example, not intended to limit the invention, user clients 116A-B may include messaging clients such as GOOGLE TALK from GOOGLE, MSN MESSENGER from MICROSOFT and YAHOO MESSENGER from YAHOO. User clients 116A-B may be used to notify a user of a scheduled conference call. A user may then use the notification to connect to the conference call.

Conference call initiator 102 may connect a plurality of users using network 104 to initiate a conference call. Referring to FIG. 2A, conference call initiator 102 may include a messaging module 202, matching information 212, call state 208 and user state 210.

Messaging module 202 may allow conference call initiator 102 to communicate with user clients 116A-B. Messaging module 202 may provide information on a user's intent to connect to a conference call. Conference call initiator 102 may then connect the user to a conference call through network 104. Furthermore, conference call initiator 102 may automatically initiate a conference call when a messaging status of two or more users in user clients 116A-B indicates that they are available. Conference call initiator 102 may use messaging module 202 to notify users of a change in agenda.

Matching information 212 contains information on a matching condition or a plurality of matching conditions required to initiate a conference call. Matching information 212 may be derived from information available to conference call initiator 102. As an example, not intended to limit the invention, a match may occur based on a matching condition when two or more users are scheduled to be in the agenda of a meeting at the same time.

Call state 208 may include information on the state of a present call. Present state of a call may include information on if the call has been initiated, is waiting to be initiated or has been completed.

User state 210 may include information on the present state of the user. Present state of a user may include information such as if the user has joined the conference call or has left the conference call.

Referring to FIG. 2B, conference call initiator 102 may additionally include, PIN (Personal Identification Number) authenticator 204, which may be used by conference call initiator 102 to request a PIN from a user when a user may want to join a conference call. PIN authenticator 204 checks PIN information 206 to verify if the PIN is authentic. PIN information 206 may be a data structure where each record corresponds to an authentic PIN. If a PIN is found to be authentic, a user may be permitted to join a conference call. In this way, an advantage of an embodiment is that a user need only remember and input a PIN to join a conference call. No participant code unique to each conference call is needed. The example of using a PIN to join a conference call is illustrative and is not intended to limit the invention. Other forms of authentication may be used by to authenticate a user prior to joining a conference call.

In another embodiment, a PIN may be used to find a meeting that was scheduled with calendar server 110. These examples are illustrative and not intended to limit the invention. In addition to a PIN, other types of authentication may be used, such as finger print, voice print and other biometric or authentication data.

Conference call initiator 102 may be able to communicate with calendar server 110 through network 104. In an embodiment of the invention, information obtained from the calendar server 110 may be used to by conference call initiator 102 to automatically initiate a conference call.

Call initiation and matching are further described with respect to the operation below.

Operation

This section describes various methods that may be used in operation of the system described in FIGS. 1-2. For clarity, the methods are described with respect to system 100, however they are not intended to be limited to system 100.

Figure 3:
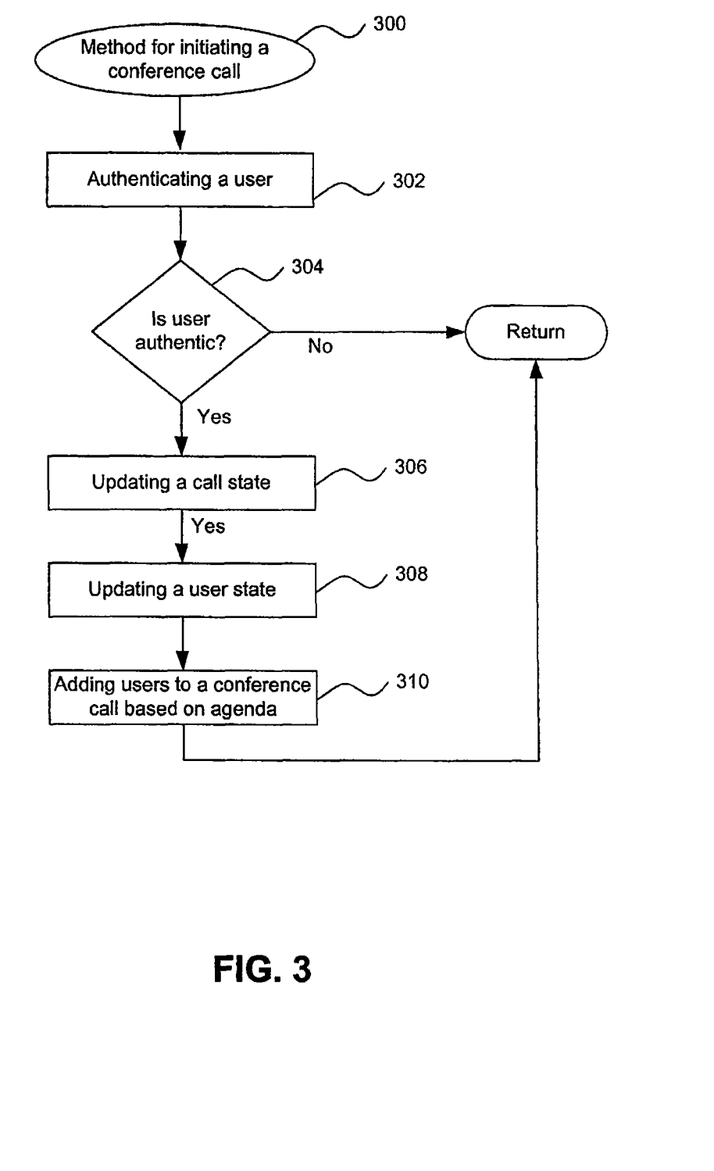
FIG. 3 is a flowchart illustrating a method used to initiate a conference call, according to an embodiment.

FIG. 3 is a flowchart, illustrating method 300 according to an embodiment of the invention which may be used to initiate a conference call (steps 302-310). Method 300 begins with authenticating a user. As an example, one or a plurality of PINs may be input by respective users 114A-B and received, for example at conference call initiator 102 for authentication, which may then be authenticated by PIN authenticator 204.

Conference call initiator 102 checks whether a user is authentic (step 304). If a user is not authentic, method 300 returns.

If user is authentic, call state 208 is updated by conference call initiator 102 (step 306). Additionally, user state 210 is updated by conference call initiator 102 (step 308). Finally, conference call initiator 102 adds users to a conference call based on an agenda (step 310).

In this way users may be automatically added to a conference call by conference call initiator 102. Step 310 is discussed in further detail with respect to an embodiment shown in FIG. 4.

Figure 4:
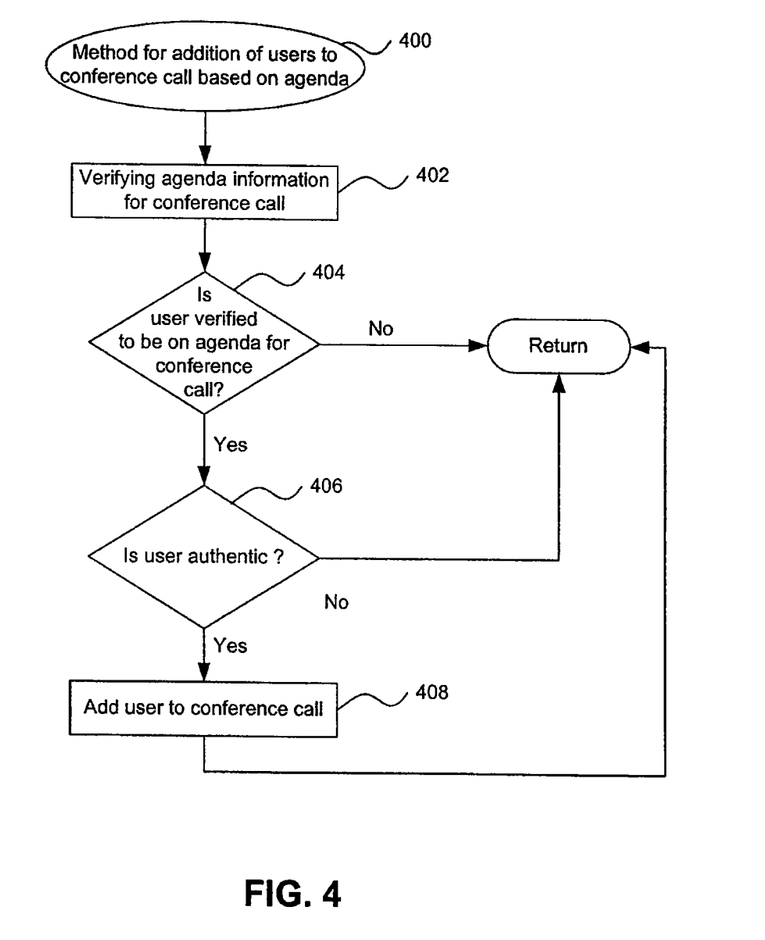
FIG. 4 is a flowchart illustrating a method to add users to a conference call according to an embodiment.

FIG. 4 is a flowchart, illustrating a method 400 according to an embodiment of the invention which may be used to add users to a conference call based on an agenda (steps 402-408). Method 400 begins with conference call initiator 102 verifying agenda information for a conference call (step 402). Conference call initiator 102 checks whether a user is on the agenda information for a conference call (step 404). If the user is not on the agenda of a conference call, method 400 returns. If a user is on the agenda of a conference call, conference call initiator 102, authenticates a user (step 406). As an example, PIN authenticator 204 may check if a user's personal identification number (PIN) is valid. If a user is not authentic method 400 returns.

If a user is authentic, conference call initiator 102 adds the user to the conference call (step 408).

In this way, a user may be added to a conference call by conference call initiator 102.

Figure 5:
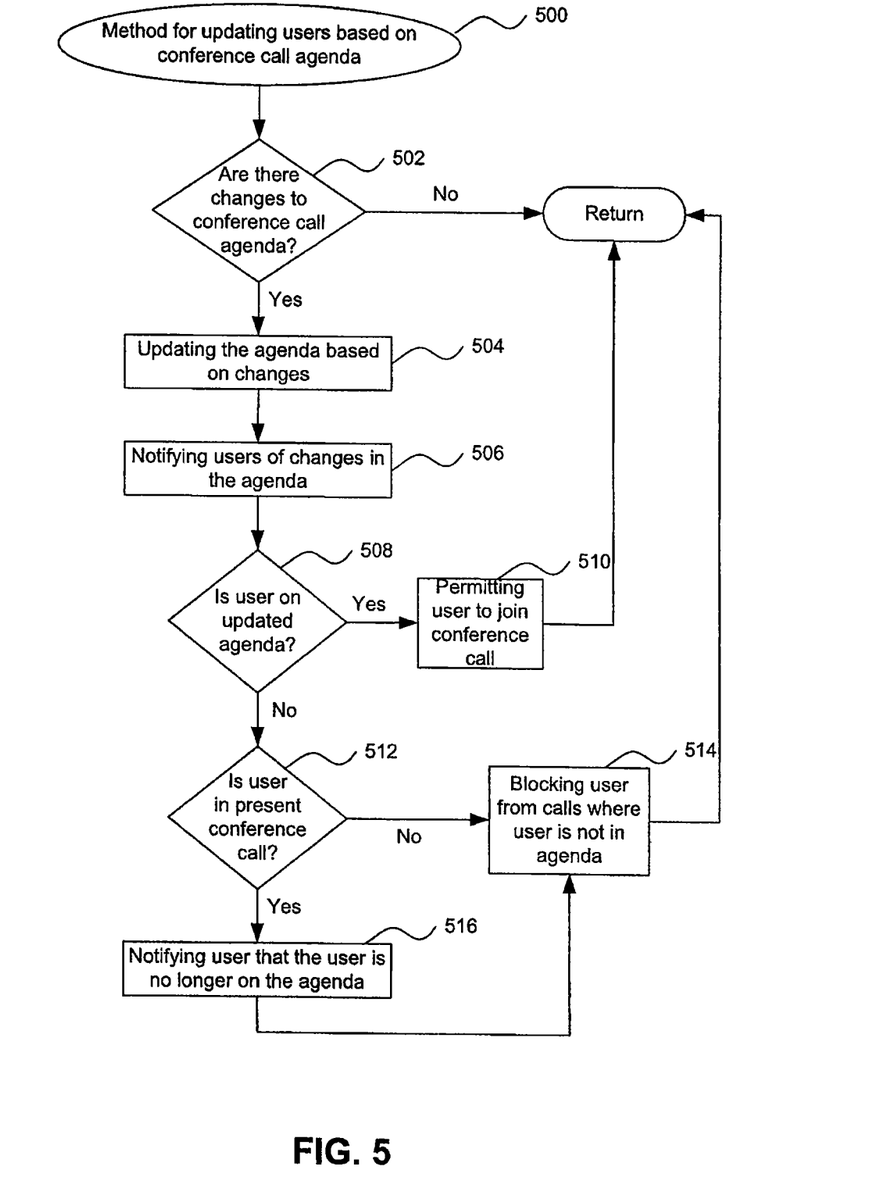
FIG. 5 is a flowchart illustrating a method to update users based on a conference call agenda according to an embodiment.

FIG. 5 is a flowchart, illustrating a method 500 according to an embodiment of the invention which may be used to update users based on a conference call agenda (steps 502-516). Method 500 begins with conference call initiator 102 checking if changes are made to a conference call agenda (step 502). As an example, conference call initiator 102 may check meeting server 106 for changes in agenda information. If the conference call agenda is unchanged, method 500 returns. If there are changes to the agenda of a conference call, conference call initiator 102 updates the agenda with the changes (step 504). Messaging module 202 in conference call initiator 102 notifies users of changes to the agenda (step 506). Conference call initiator checks if a user is on the updated agenda (step 508). If a user is on the updated agenda, conference call initiator 102 permits the user to join the conference call (step 510). If a user is not on the updated agenda, conference call initiator 102 checks if the user is participating in a presently occurring conference call (step 512). If a user is not participating in a presently occurring conference call, conference call initiator 102 may block a user from conference calls where a user is not in the agenda (step 514). If a user is participating in a presently occurring conference call, conference call initiator 102 may notify a user using a user client that the user is no longer on the agenda of the conference call (step 516). In this way, users may be updated based on conference call agenda by conference call initiator 102.

Figure 6:
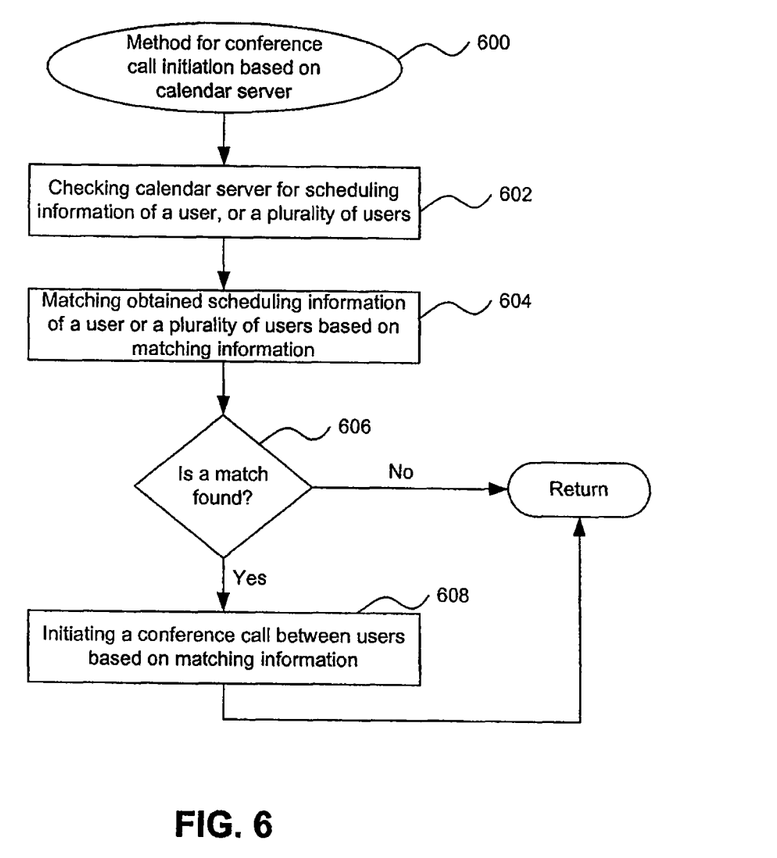
FIG. 6 is a flowchart illustrating a method used to initiate a conference call based on information in a calendar server according to an embodiment.

FIG. 6 is a flowchart, illustrating a method 600 according to an embodiment of the invention which may be used to initiate a conference call based on a calendar server (steps 602-608). Method 600 begins with conference call initiator 102 checking a calendar server 110 for scheduling information of a user or a plurality of users (step 602). Conference call initiator 102 matches the obtained scheduling information of a user or a plurality of users based on matching information (step 604). As an example, scheduling information may be stored in calendar server 110 and matching information may be matching information 212. Conference call initiator 102 checks if a match is found (step 606). If a match is found, conference call initiator 102 initiates a conference call between users based on matching information 212 (step 608). In this way, a conference call may be initiated based on a calendar server by conference call initiator 102.

Example Operation

Figure 7:
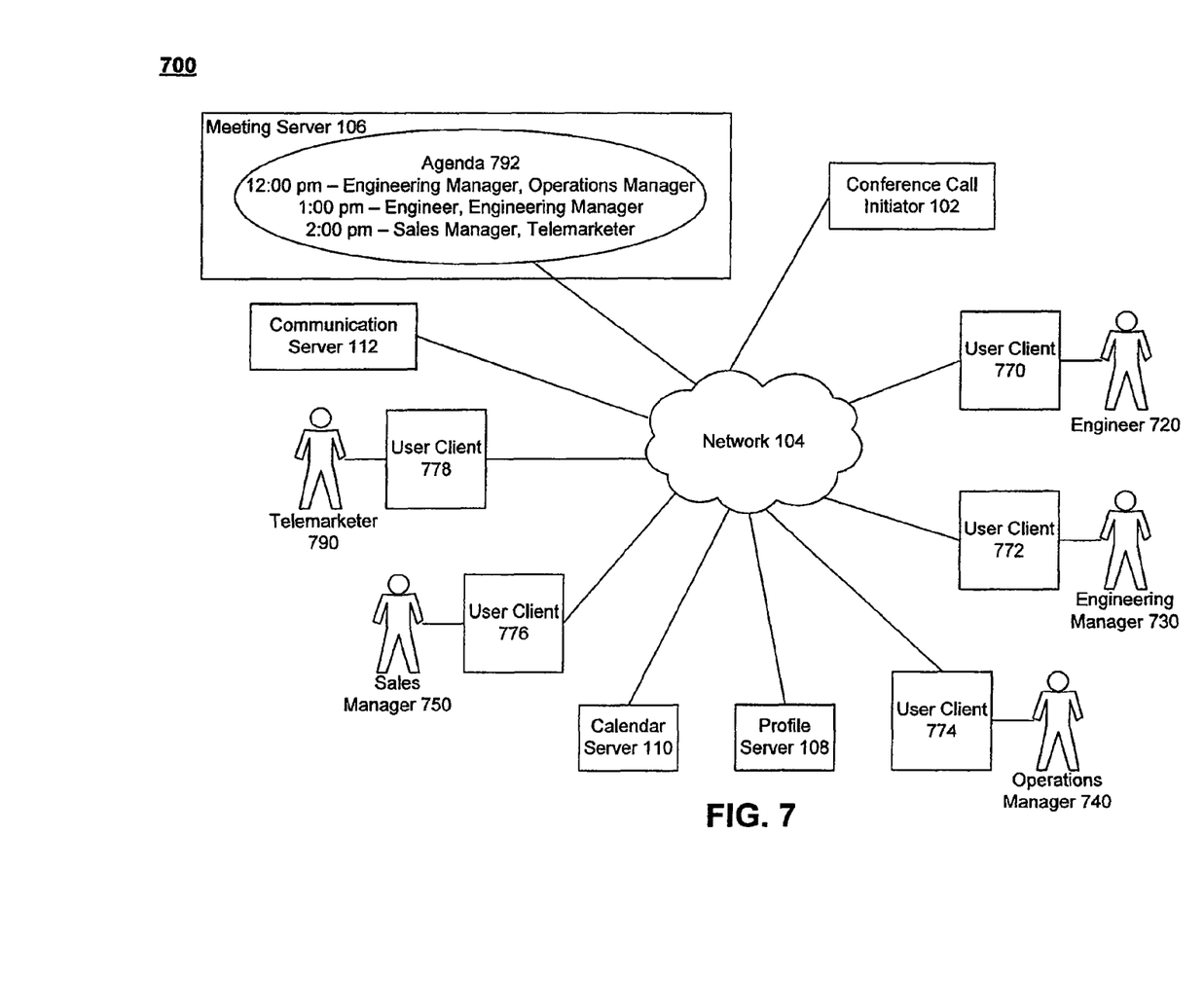
FIG. 7 illustrates an example of a conference call between several users according to an embodiment.

FIG. 7 is a diagram illustrating an example of a conference call system 700 that may be initiated between several individuals, such as, an engineer 720, engineering manager 730, operations manager 740, sales manager 750 and telemarketer 790 through network 104. Conference call system 700 gets information on an agenda of a meeting from agenda 792. Agenda 792 may include the names of the users to participate for a certain time period in the conference call. As an example, agenda 792 may be stored as a data structure with every conference call having a unique record in the data structure that stores the conference call's agenda for any particular time frame. As an example, not intended to limit the invention, agenda 792 may be stored for access by meeting server 106. Consider an example of a scenario where engineer 720, engineering manager 730, operations manager 740, sales manager 750 and telemarketer 790 are initiated into a conference call through their respective clients by conference call initiator 102. Conference call initiator 102 may check if users need to join or leave a conference call based on agenda 792 and notify respective users through their corresponding user clients. Conference call initiator 102 may access an agenda 792. As an example, agenda 792 may contain information such as names of users that may be required to participate at certain portions of a conference call. For example, agenda 792 may indicate that indicates that there is conference call scheduled between the engineering manager 730 and operations manager 740 at 12:00 pm. Conference call initiator 102 automatically initiates a call to the engineering manager 730 and the operations manager 740 so that they may begin a conference call. At 1:00 pm, agenda 792 indicates that only engineering manager 730 and engineer 720 are needed to participate in conference call system 700. All the participants in conference call system 700 are notified through their respective clients of the change in agenda 792 by conference call initiator 102. Clients 770, 772, 774, 776 and 778 may include, but are not limited to, chat clients, email clients or short message service clients. Any participant in the conference call who does not appear on agenda 792 may be automatically notified through a client, for example, user client 116A that the participant is not longer on the agenda of the call. In this example, operations manager 740 may be notified using user client 774 that operations manager 740 is no longer on the agenda of the conference call. Additionally, engineer 720 is added to conference call system 700. Thus at 1:00 pm, engineering manager 730 and engineer 720 are the only participants in conference call system 700. At 2:00 pm, agenda 792 indicates that only sales manager 750 and telemarketer 790 are needed to participate in conference call system 700. All the participants in the present conference call system 700 are notified through their respective clients of the change in agenda 792 through their respective clients. Any participant in the conference call who does not appear on agenda 792 may be notified through a respective user client. In this example, engineering manager 730 and engineer 720 are notified by user clients 772 and 770 respectively and may choose to leave conference call system 700. Sales manager 750 and telemarketer 790 are added to conference call system 700. Thus at 2:00 pm, sales manager 750 and telemarketer 790 are may be the only participants in conference call system 700. In this way, users or participants in a conference call may be added or notified that they are no longer required to be a part of conference call system 700 by conference call initiator 102 depending upon agenda 792. In an example, not intended to limit the invention, conference call initiator 102 may automatically drop a user from a conference call based on an agenda. For example, engineering manager 730 may be automatically dropped from conference call system 700 after providing a notification through user client 772. This may reduce overhead involved in scheduling and agenda management of a conference and may save user time and enhance user experience.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodi-

What is claimed is:

1. A system for automatically initiating a conference call between two or more users over a network, the system comprising:
   a meeting server to maintain meeting information for the two or more users, wherein the meeting information includes information on the two or more users required to participate in a meeting and whether the two or more users have accepted to participate in the meeting;
   a calendar server to maintain calendar information for the two or more users, wherein the calendar information includes one or more dates and times when the two or more users are available to participate in the meeting;
   a profile server to maintain profile information for the two or more users, wherein the profile information includes names of the two or more users; and
   a conference call initiator;
   wherein the meeting server, the calendar server, the profile server and the conference call initiator are configured to communicate over the network;
   wherein the conference call initiator analyzes the meeting information, the calendar information and the profile information that are respectively maintained at the meeting server, the calendar server and the profile server for the two or more users to determine a matching condition, and initiates the conference call when a matching condition is determined; and
   wherein the conference call initiator is configured to add an additional user to the conference call at a scheduled time different than when the conference call was initiated.

2. The system of claim 1, wherein the conference call initiator requests a personal identification number ("PIN") for each of the two or more users, wherein each of the two or more users provides a PIN and wherein the conference call initiator initiates the conference call based on a match between the provided PINs and the matching condition of the two or more users.

3. The system of claim 2, wherein each PIN is used to authenticate a user and the PIN information is used to find a meeting that was scheduled with the calendar server, wherein the conference call is initiated based on the found meeting.

4. The system of claim 1, wherein the meeting server is configurable by a user to maintain an agenda for the conference call.

5. The system of claim 1, wherein the conference call initiator notifies the two or more users about a change in agenda.

6. The system of claim 1, wherein the conference call initiator further comprises a messaging module, wherein the conference call initiator initiates the meeting when a messaging status of the two or more users indicates availability and the calendar server shows the two or more users accepted the meeting appointment.

7. A method for automatically initiating a conference call, between two or more users over a network, by a conference call initiator, the method comprising:
   retrieving meeting information of the conference call by the conference call initiator, wherein the meeting information is stored in the meeting server;
   verifying, by the conference call initiator, whether a user is on the meeting information for the conference call;
   adding the user to the conference call when the user is verified;
   adding additional users to the conference call when the additional users are scheduled to join the conference call; and
   wherein the additional users are scheduled to join the conference call at a time different from the user.

8. The method of claim 7, further comprising receiving a personal identification number ("PIN") from the user and authenticating the PIN prior to adding the user.

9. The method of claim 7, wherein the adding additional users comprises adding the additional users to the conference call when an agenda indicates the additional users are required to join the conference call.

10. The method of claim 9, further comprising updating the agenda including changing the time or users in the conference call.

11. The method of claim 7, further comprising dropping users when an agenda indicates the user is no longer needed to participate in the conference call.

12. The method of claim 7, further comprising notifying the two or more users of a change in the agenda.

13. The system of claim 6, wherein the conference call initiator further comprises a matching information module, a call state module and a user state module, wherein the matching module maintains information on the matching condition required to initiate the conference call, the call state module maintains information on present state of the conference call, and the user state module maintains information on present state of the user.

14. A method for automatically initiating a conference call, between two or more users over a network, by a conference call initiator, the method comprising:
   retrieving an agenda of the conference call by the conference call initiator, wherein the agenda is stored in the meeting server;
   verifying, by the conference call initiator, whether a user is on the agenda for the conference call;
   adding the user to the conference call when the user is verified; and
   wherein the agenda includes at least one additional user scheduled to be added to the conference call at a different time than the user.

15. The method of claim 14, wherein the agenda defines a plurality of time slots, the plurality of time slots each define a period of time a different user is scheduled to be added to the conference call.

16. The method of claim 14, further comprising dropping the user or the at least one additional user when the agenda indicates the user or the at least one additional user is no longer needed to participate in the conference call.

17. The method of claim 14, further comprising notifying the user and the at least one additional user of a change in the agenda.

* * * * *